United States Patent
Peretz et al.

(10) Patent No.: US 10,326,359 B2
(45) Date of Patent: Jun. 18, 2019

(54) VOLTAGE REGULATOR MODULE USING A LOAD-SIDE AUXILIARY GYRATOR CIRCUIT

(71) Applicant: B.G. NEGEV TECHNOLOGIES AND APPLICATIONS LTD., AT BEN-GURION UNIVERSITY, Beer Sheva (IL)

(72) Inventors: Mor Mordechai Peretz, Lehavim (IL); Alon Cervera, Rehovot (IL); Or Kirshenboim, Tel-Aviv (IL)

(73) Assignee: B.G. NEGEV TECHNOLOGIES AND APPLICATIONS LTD., AT BEN-GURION UNIVERSITY, Beer Sheva (IL)

( * ) Notice: Subject to any disclaimer, the term of this patent is extended or adjusted under 35 U.S.C. 154(b) by 87 days.

(21) Appl. No.: 15/509,934

(22) PCT Filed: Sep. 7, 2015

(86) PCT No.: PCT/IL2015/050899
§ 371 (c)(1),
(2) Date: Mar. 9, 2017

(87) PCT Pub. No.: WO2016/038601
PCT Pub. Date: Mar. 17, 2016

(65) Prior Publication Data
US 2017/0302172 A1     Oct. 19, 2017

Related U.S. Application Data

(60) Provisional application No. 62/048,287, filed on Sep. 10, 2014.

(51) Int. Cl.
*H02J 9/00* (2006.01)
*H02M 1/00* (2006.01)
(Continued)

(52) U.S. Cl.
CPC .............. *H02M 3/156* (2013.01); *H02J 9/00* (2013.01); *H02M 3/1584* (2013.01);
(Continued)

(58) Field of Classification Search
CPC .......... H02J 50/12; H02J 7/0047; H02J 50/90; H02J 7/025; H02J 2007/005
See application file for complete search history.

(56) References Cited

U.S. PATENT DOCUMENTS

2007/0001653 A1  1/2007  Xu
2008/0157742 A1* 7/2008  Martin ................ H02M 3/1584
                                                 323/284
(Continued)

FOREIGN PATENT DOCUMENTS

IN   1003/KOL/2009 A   11/2012
WO   2015177786 A1     11/2015

OTHER PUBLICATIONS

International Search Report of PCT/IL2015/050899, dated Nov. 29, 2015.
(Continued)

*Primary Examiner* — Jared Fureman
*Assistant Examiner* — Duc M Pham
(74) *Attorney, Agent, or Firm* — Jeffri A. Kaminski; Venable LLP

(57) ABSTRACT

The present invention introduces a new compact Voltage Regulator Module (VRM) solution that hybrids a buck converter with a resonant switched-capacitor auxiliary circuit that is connected at the load side. By using a new control concept of the present invention, the auxiliary circuit effectively mimics increased capacitance during loading and unloading transient events, reducing the burden on both the input and output filters, and reduces the current stress.

15 Claims, 14 Drawing Sheets

(51) Int. Cl.
*H02M 3/156* (2006.01)
*H02M 3/158* (2006.01)

(52) U.S. Cl.
CPC .. *H02M 3/1588* (2013.01); *H02M 2001/0019* (2013.01); *H02M 2003/1566* (2013.01); *Y02B 70/1425* (2013.01); *Y02B 70/1466* (2013.01)

(56) References Cited

U.S. PATENT DOCUMENTS

| | | | | | |
|---|---|---|---|---|---|
| 2009/0174262 | A1* | 7/2009 | Martin | | H02M 3/157 307/82 |
| 2011/0316508 | A1* | 12/2011 | Cheng | | H02M 1/14 323/282 |
| 2014/0021930 | A1* | 1/2014 | Liu | | H02M 3/1584 323/271 |
| 2015/0160669 | A1* | 6/2015 | Marschalkowski | | G05F 1/59 323/273 |

OTHER PUBLICATIONS

Written Opinion of PCT/IL2015/050899, dated Nov. 29, 2015.
Shoyama et al., Resonant Switched Capacitor Converter with High Efficiency, 2004 35th Annual IEEE Power Electronics Specialists Conference, Kyushu University, Jun. 25, 2004, pp. 3780-3786.
Shan et al., "Transient Mitigation of DC-DC Converters for High Output Current Slew Rate Applications," IEEE Trans. Power Electron., vol. 28, No. 5, pp. 2377-2388, May 2013.
Cervera et al., "A High Efficiency Resonant Switched Capacitor Converter with Continuous Conversion Ratio," IEEE Trans. Power Electron, vol. 30, No. 3, pp. 1373-1382, Mar. 2015.
Cervera et al., "Resonant Switched-Capacitor Voltage Regulator With Ideal Transient Response," IEEE Transactions on Power Electronics, vol. 30, No. 9, pp. 4943-4951, Sep. 2015.
Halihal et al., "Full FPGA-Based Design of a PWM/CPM Controller with Integrated High-Resolution Fast ADC and DPWM Peripherals," IEEE Workshop on Control and Modeling for Power Electronics (COMPEL) 2014.

* cited by examiner

| Component | Value |
|---|---|
| Input voltage $V_{in}$ | 12 V |
| Output voltage $V_{out}$ | 1.5 V |
| Main inductor $L$ | 0.5 uH |
| Output capacitor $C_{out}$ | 200 uF |
| Buck converter switching freq. $f_s$ | 500 kHz |
| GRSCC maximal switching freq. $f_{aux}$ | ~1 MHz |
| Auxiliary capacitor $C_{aux}$ | 30 uF |
| GRSCCs resonant tank capacitor $C_g$ | 0.5 uF |
| GRSCCs resonant tank inductor $L_g$ | ~20 nH |
| Number of GRSCC stages | 3 |

# VOLTAGE REGULATOR MODULE USING A LOAD-SIDE AUXILIARY GYRATOR CIRCUIT

CROSS-REFERENCES TO RELATED APPLICATIONS

This application is a U.S. National Stage application of PCT/IL2015/050899, filed 7 Sep. 2015 and published on 17 Mar. 2016 as WO 2016/038601, which claims the benefit of U.S. Provisional Patent Application No. 62/048,287, filed 10 Sep. 2014, both of which are hereby incorporated by reference in their entireties.

FIELD OF INVENTION

The invention is in the field of Power Electronics. More specifically the invention relates to improving loading and unloading transient response of a voltage regulator module using a load-side auxiliary gyrator resonant switched-capacitor circuit.

BACKGROUND OF THE INVENTION

In recent years there has been a sharp rise in interest and demand for more compact, light, energy efficient and economical voltage regulation solutions. In particular, tighter output voltage regulation, faster response times and lower volume are of major concern in the design of present-day voltage-regulator modules (VRM). For processing power from fractions of a watt to several tens of watts with fast transient performance, multi-stage interleaved converters combined with analog controllers have been predominantly used. There, fast response is usually achieved by designing a wide bandwidth control loop.

The advancement in hardware-efficient digital controllers enabled the implementation of advanced nonlinear control methods that improve the dynamic performance and, as a consequence, drastically reduce the size of the output capacitor. Among them, time-optimal control (TOC) and minimum-deviation controllers have demonstrated transient response with virtually the smallest possible voltage deviation, restricted only by the inductor's slew-rate. In VRM applications, this limitation has a major effect on the output voltage deviation for the case of an unloading transient event, primarily due to the high input-to-output conversion ratio. Another weakness of the classical time-optimal approach is the relatively higher current stress, beyond the steady-state value, that is required to restore the lost charge of the output capacitor during the recovery time. As a result, the overall power processing efficiency is impacted from consecutive transients, when compared to steady-state.

State-of-the-art solutions that exceed the performance of the time-optimal control method propose several circuit extensions to the original buck converter in order to increase the inductor's slew-rate. For example, extensions have been presented by addition of a fast auxiliary converter in parallel to the main converter with smaller inductance or with active region current injection circuit. However, it comes at the cost of an increased input filter since the load transient is reflected to the input. This is partly resolved by compensating only for half of the current mismatch, which does not increase transient time.

Recent studies have reported improved loading and unloading transient performance, obtained using an auxiliary converter connected to the output side [Z. Shan, S. C. Tan, and C. K. Tse, "Transient mitigation of dc-dc converters for high output current slew rate applications," IEEE Trans. Power Electron., vol. 28, no. 5, pp. 2377-2388, May 2013.]. An independent energy bank is used, eliminating the impact on the input. However, this solution requires additional sensors to regulate the auxiliary operation and is limited by switching frequency to mid-range output voltages.

A recently-developed resonant switch-capacitor based gyrator converter (GRSCC) presented in [A. Cervera M. Evzelman, M. M. Peretz, and S. Ben-Yaakov, "A High Efficiency Resonant Switched Capacitor Converter with Continuous Conversion Ratio," IEEE Trans. Power Electron, vol. 30, no. 3, pp. 1373-1382, March 2015] demonstrated an ultra-compact voltage regulator solution which obtains ideal transient response [A. Cervera, M. M. Peretz, "Resonant switched-capacitor voltage regulator with ideal transient response," IEEE Transactions on Power Electronics, vol. 30, no. 9, pp. 4943-4951, September 2015]. However, a modest efficiency (around 85%) at steady-state is achieved due to high RMS currents. Nonetheless, its main advantage is that no magnetic element is required, allowing on-chip integration.

It is therefore an object of the present invention to introduce a new compact VRM solution that hybrids a buck converter with a resonant switched-capacitor auxiliary circuit that is connected at the load side to improve the response to transient effects in a minimum time and improved efficiency;

It is another object of the present invention to reduce the total volume of a voltage regulator module.

It is another object of the present invention to present a simple and cost effective solution by receiving an indication from the output voltage alone.

SUMMARY OF THE INVENTION

In one aspect the present invention relates to a voltage regulator module circuit, comprising: a main converter having a first control circuitry, being capable of maintaining at steady-state, a desired output voltage across said load; an auxiliary circuit, connected to the load and having an energy aggregating module and a second control circuit, which operates in combination with the main converter, for assisting said main converter to rapidly compensate changes in the output voltage during time periods with abrupt current changes consumed by the load; wherein the auxiliary circuit is controlled by the second control circuitry, to aggregate excess charge provided to the load when the output voltage is above a first threshold and to transfer charge into the load when the output voltage is below second threshold, while during charge aggregation and transfer, allowing the first control circuitry to maintain a desired output voltage across the load.

In an embodiment of the invention, the voltage regulator module, comprising:
 a. a steady-state switch-mode main DC-DC converter having a steady-state control circuitry, for maintaining a desired output voltage;
 b. an auxiliary circuit connected in parallel to said load for assisting the main converter to rapidly compensate changes in said output voltage during time periods with abrupt current changes on the load connected to the output of said main converter, said auxiliary circuit including
    b.1. a capacitor connected in parallel to said load, via a resonant circuit and array of switches, for accumulating excess charge when said output voltage exceeds a first threshold above said desired output voltage and for transferring charge into said load when said output voltage exceed a second threshold below said desired output voltage;

b.2. a transient control circuitry consisting of a first comparator for sensing when the output voltage exceeds said first threshold and a second comparator for sensing when the output voltage exceeds said second threshold;

b.3. a logic and drive circuitry for controlling said array of switches and the inputs to said main converter during time periods with abrupt current changes on said load;

b.4. a multiplexer for connecting said steady-state control circuitry to said inputs during time period with no abrupt current changes in said load and for connecting said transient control circuitry during time periods with abrupt current changes on said load;

wherein said logic and drive circuitry is adapted to; control said array of switches to transfer a sequence of consecutive current pulses of constant magnitude as long as said output voltage exceeds said first threshold;

control said array to stop transferring said sequence when said output voltage does not exceed said first threshold for a predetermined time period, or when said output voltage is below said second threshold.

In an embodiment of the invention, during time periods with no abrupt current changes on the load, the transient control circuitry is adapted to: charge or discharge the capacitor to reach a nominal voltage before starting the compensation for the next period by controlling the array of switches to connect and disconnect said capacitor to said load for predetermined time periods, such that in response, the steady-state control circuitry compensates changes in the output voltage during the charge or discharge of said capacitor.

In an embodiment of the invention, the auxiliary circuit comprises:

a. a capacitor connected in parallel to a series resonant circuit via a first switch connecting one port of said capacitor to one port of said resonant circuit and a second switch connecting between the second port of said capacitor to the second port of said resonant circuit;

b. a third switch connecting said one port. of said capacitor to one port of the load;

c. a fourth switch connecting between said one port of the load and the second port of said resonant circuit;

wherein the second port of said capacitor is directly connected to the second port of said load.

In an embodiment of the invention, the auxiliary energy bank capacitor is connected to an energy absorbing or injecting circuit.

In an embodiment of the invention, the control is done by voltage sensing alone.

In an embodiment of the invention, the constant magnitude of said sequence of consecutive current pulses is at least half of the maximal load current change, being at least half of the rated current of the main converter.

In an embodiment of the invention, the main converter is a switch-mode step-down converter.

In an embodiment of the invention, the voltage regulation circuit comprises multiple interleaved auxiliary circuits connected in parallel to said load.

In an embodiment of the invention, the constant magnitude of said sequence of consecutive current pulses is at least $1/(2n)$ of the maximal load current change, being at least $1/(2n)$ of the rated current of the main converter, where n is the number of the multiple interleaved auxiliary circuits.

In another aspect, the present invention relates to a method for improving the response to abrupt changes of load current of a voltage regulator circuit, comprising:

a. providing a main converter having a first control circuitry, being capable of maintaining at steady state, a desired output voltage across said load;

b. during time periods with abrupt current changes consumed by said load, activating an auxiliary circuit, connected to said load and having an energy aggregating module and a second control circuit, which operates in combination with said main converter, for assisting said main converter to rapidly compensate changes in said output. voltage by: controlling said auxiliary circuit, by said second control circuitry, to aggregate excess charge provided to said load when said output voltage is above a first threshold and to transfer charge into said load when said output voltage is below second threshold, while during charge aggregation and transfer, allowing said first control circuitry to maintain a desired output voltage across said load.

In an embodiment of the invention, the method comprises:

a. maintaining, by a steady-state main DC-DC converter having a steady-state control circuitry, a desired output voltage;

b. assisting the main converter to rapidly compensate, by an auxiliary circuit connected in parallel to said load, changes in said output voltage during time periods with abrupt current changes on the load connected to the output of said main converter;

c. accumulating, by a capacitor connected in parallel to said load, via a resonant circuit and array of switches, excess charge when said output voltage exceeds a first threshold above said desired output voltage and transferring charge into said load when said output voltage exceed a second threshold below said desired output voltage;

d. sensing, by a transient control circuitry consisting of a first comparator, when the output voltage exceeds said first threshold, and sensing by said transient control circuitry consisting of a second comparator, when the output voltage exceeds said second threshold;

e. controlling, by a logic and drive circuitry, said array of switches and the inputs to said main converter during time periods with abrupt current changes on said load;

f. connecting by a multiplexer, said steady-state control circuitry to said inputs during time period with no abrupt current changes in said load and said transient control circuitry during time periods with abrupt current changes on said load;

g. controlling said array of switches to transfer a sequence of consecutive current pulses of said constant magnitude as long as said output voltage exceeds said first threshold; and h. controlling said array to stop transferring said sequence when said output voltage does not exceed said first threshold for a predetermined time period, or when said output voltage is below said second threshold.

In an embodiment of the method of the invention, the constant magnitude of said sequence of consecutive current pulses is at least half of the maximal load current change, being at least half of the rated current of the main converter.

In an embodiment of the method of the invention, the control is done by voltage sensing alone.

In an embodiment of the method of the invention, the voltage regulation circuit comprises multiple interleaved auxiliary circuits connected in parallel to said load.

In an embodiment of the method of the invention, the constant magnitude of said sequence of consecutive current pulses is at least 1/(2n) of the maximal load current change, being at least 1/(2n) of the rated current of the main converter, where n is the number of the multiple interleaved auxiliary circuit.

In an embodiment of the method of the invention, the energy aggregating module is a capacitor or a power supply.

Figure 7:
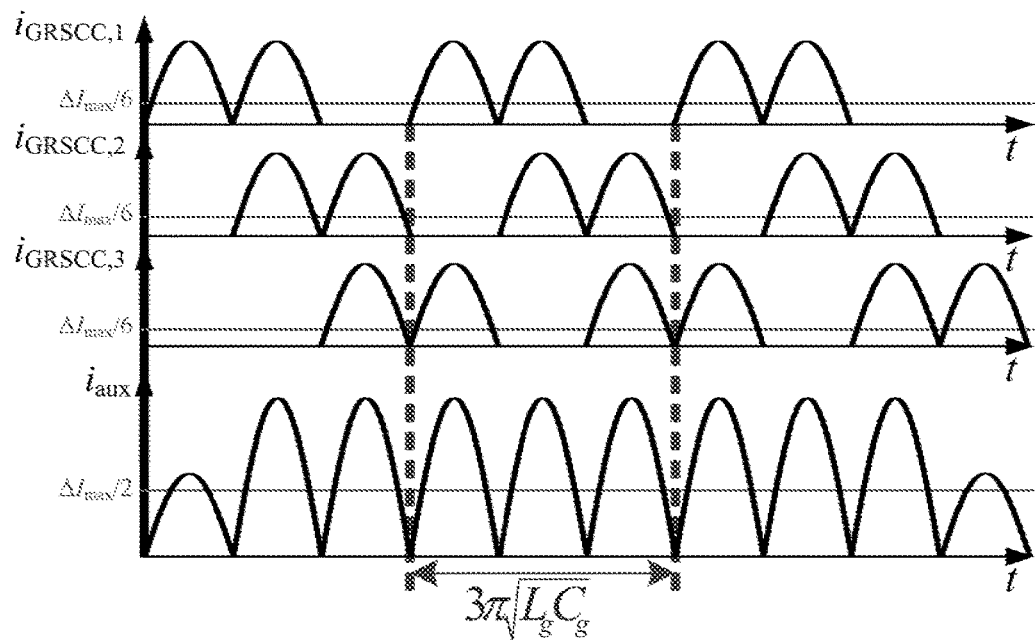
Figure 8:
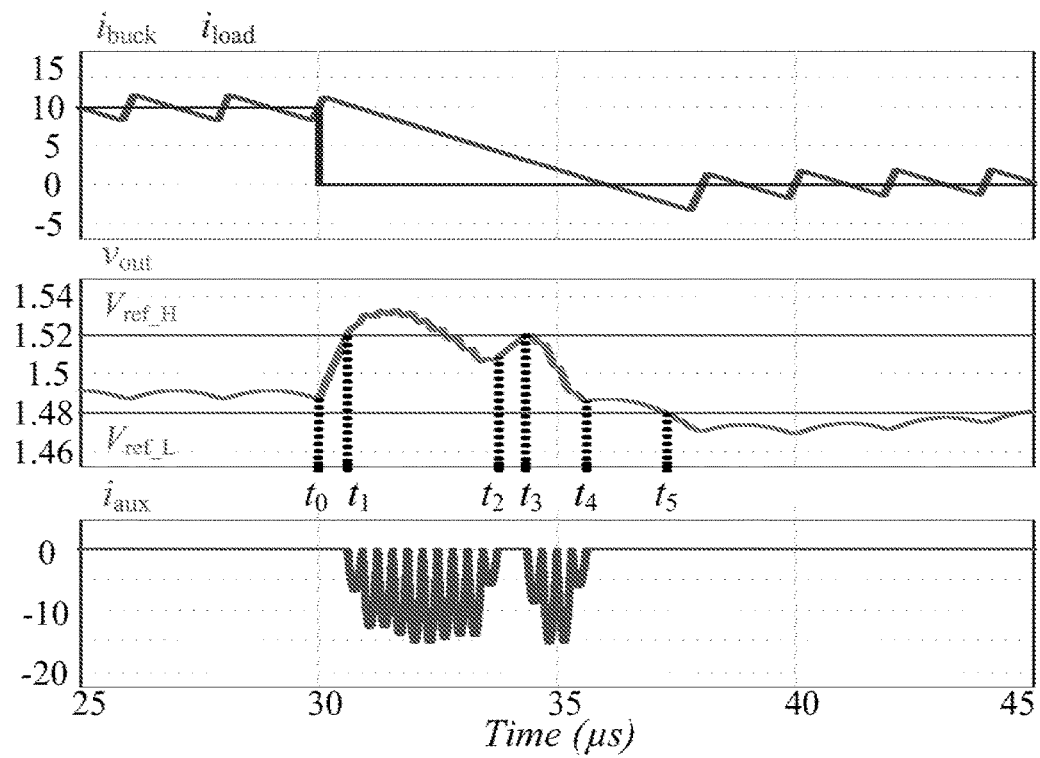
Figure 9:
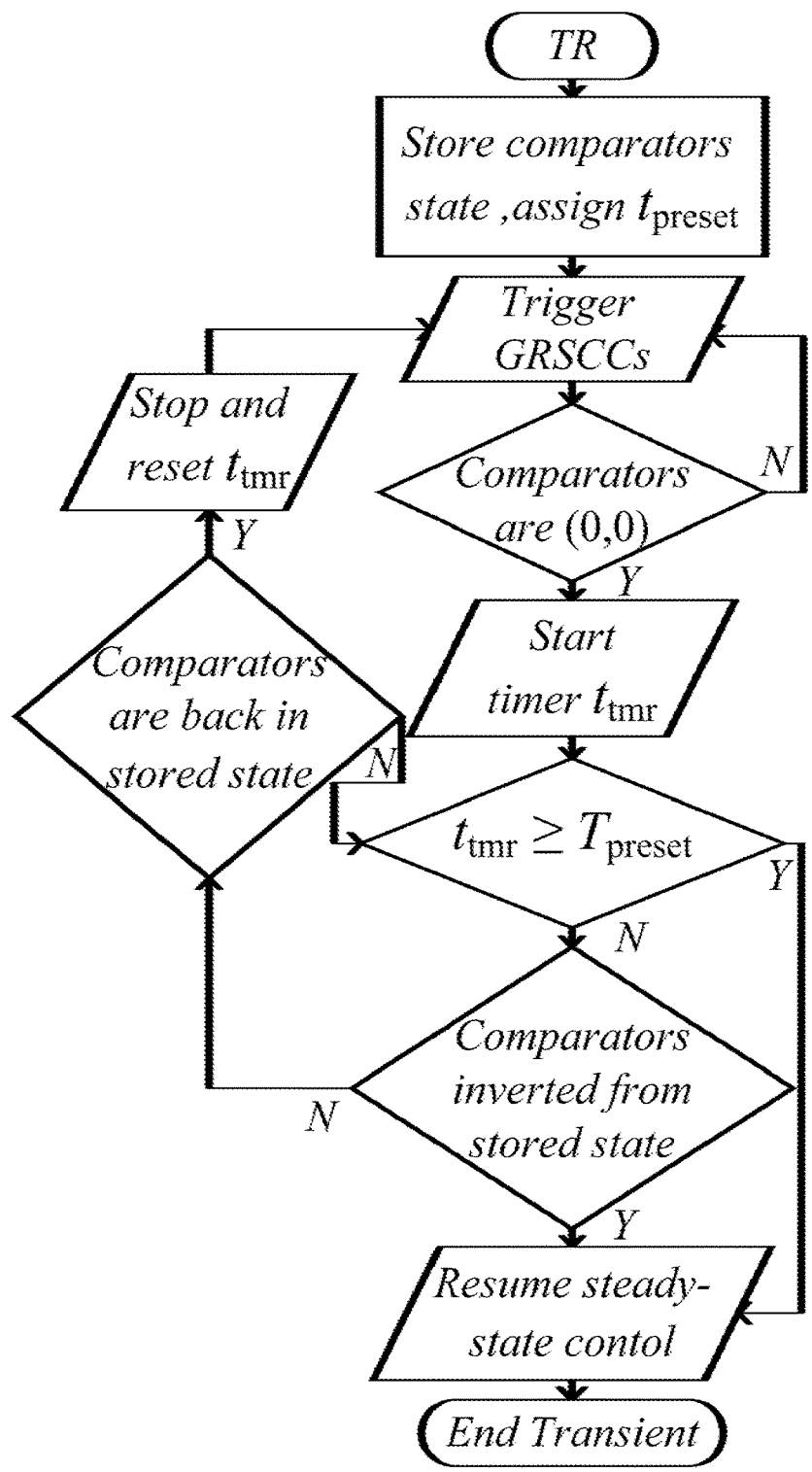
Figure 10:
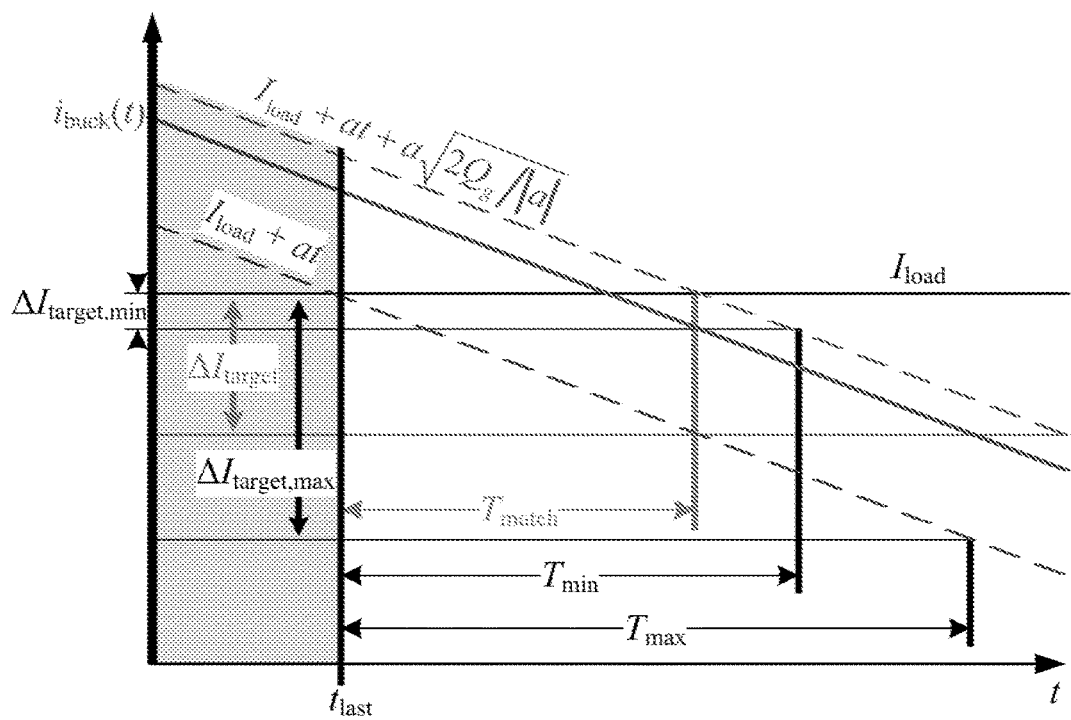
Figure 11:
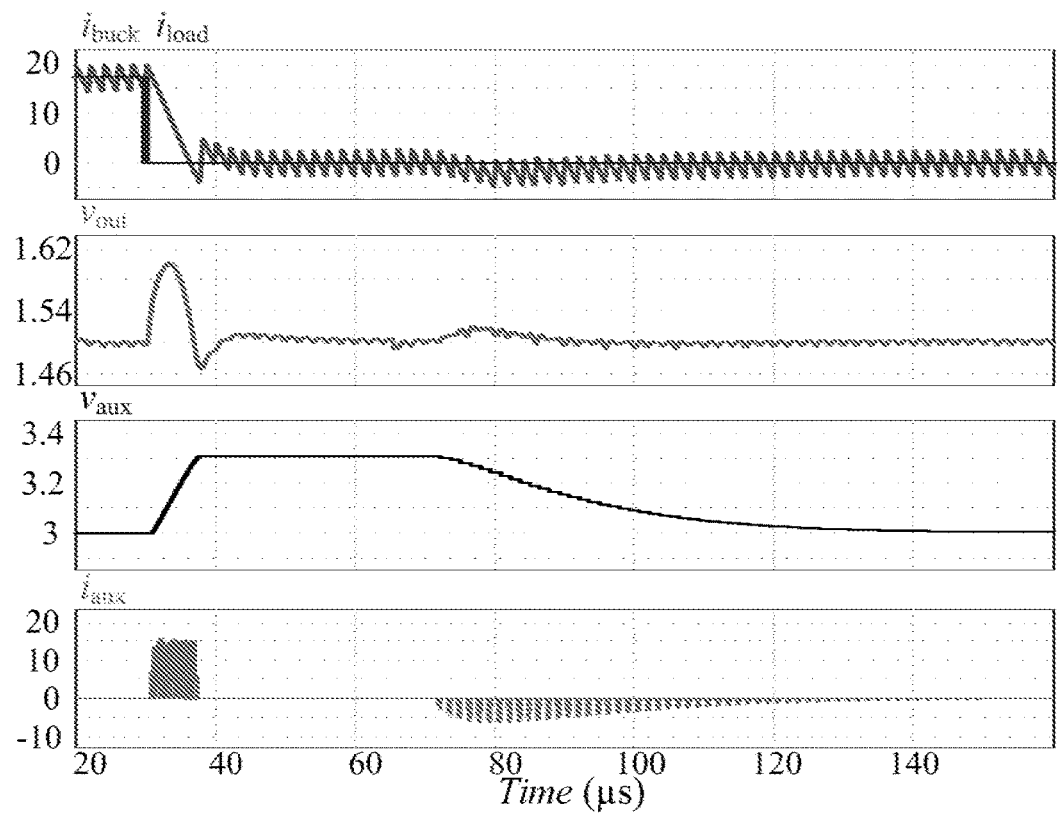
Figure 12:
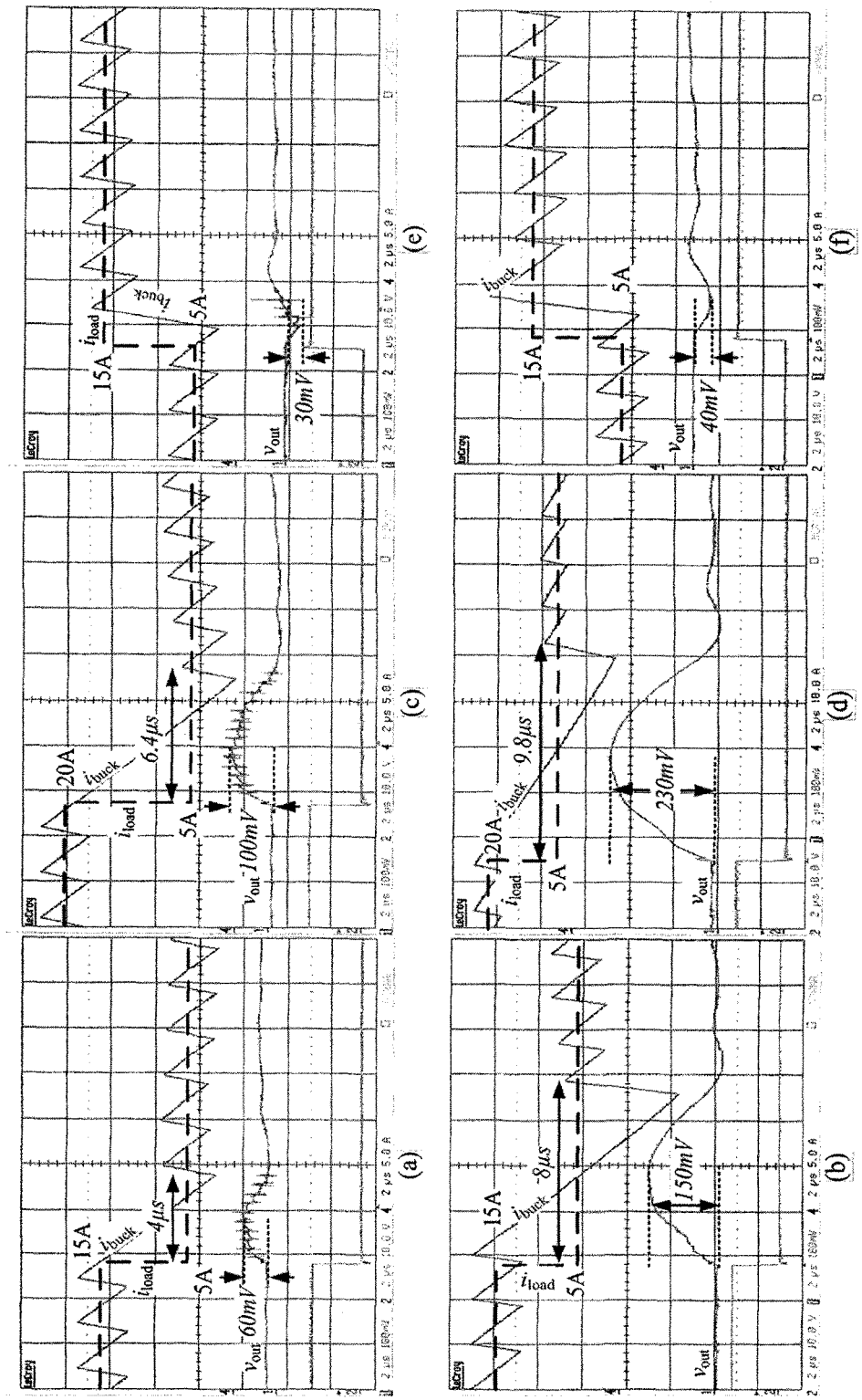
Figure 13:
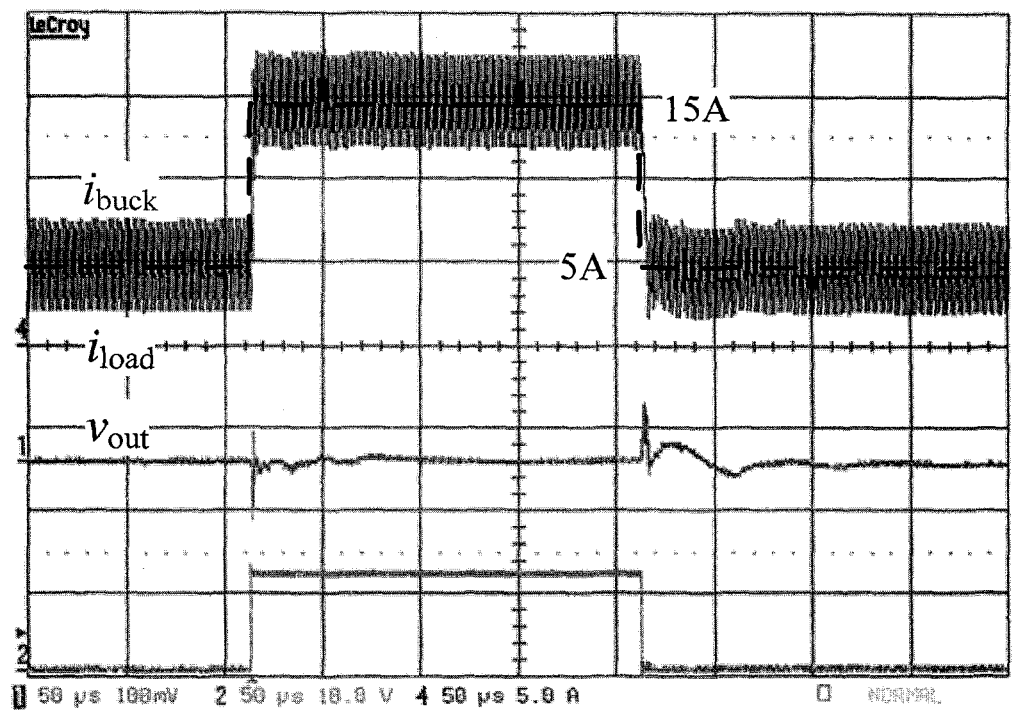

transient rate for two load-step magnitudes. Rloss=10 mΩ, switching losses are not considered;

FIG. 7 schematically shows Distribution of the auxiliary current between three interleaved GRSCCs operating at maximum frequency with half-resonance phase delay;

FIG. 8 is a schematic simulation results for the response of the hybrid-VRM to an unloading event;

FIG. 9 flowchart of the end-of-transient algorithm;

FIG. 10 schematically shows Possible range of the buck inductor current around the $t_{present}$ instance;

FIG. 11 schematically shows an unloading transient that causes vaux to rise due to the current sinking operation;

FIG. 12 schematically shows the system's response to various loading and unloading transient events of 10A and 15A, in comparison to a buck converter operating under TOC, using same transient detection circuit;

FIG. 13 shows the system's response to a consecutive loading-unloading event of 10A (5A to 15A to 5A)

Figures 14, 15:
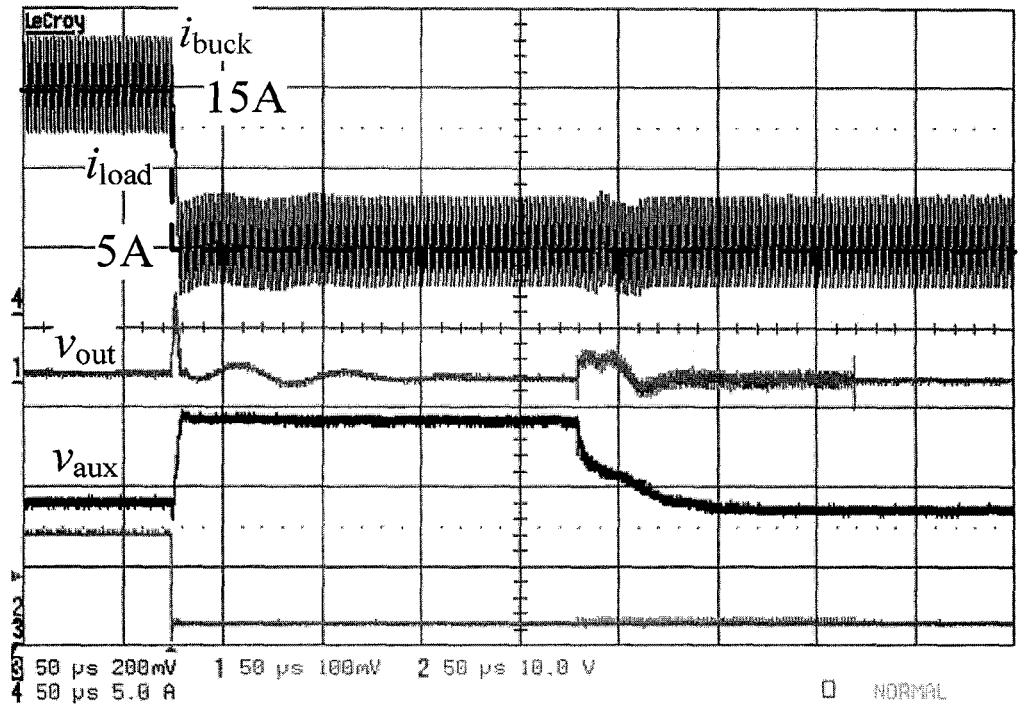

FIG. 14 shows the auxiliary reset procedure, confirming its capability to balance the charge of the auxiliary capacitor without affecting the steady-state operation; and FIG. 15 is a table of Experimental Prototype Values.

DETAILED DESCRIPTION OF THE EMBODIMENTS OF THE INVENTION

The present invention introduces a new compact Voltage Regulator Module (VRM) solution that hybrids a buck converter with a resonant switched-capacitor auxiliary circuit that is connected at the load side. By using a new control concept of the present invention, the auxiliary circuit effectively mimics increased capacitance during loading and unloading transient events, reducing the burden on both the input and output filters, and reduces the current stress. In addition, an advantage of the hybrid-VRM of the present invention is that it requires indication from the output voltage alone, making this solution simple and cost-effective.

Figure 2:
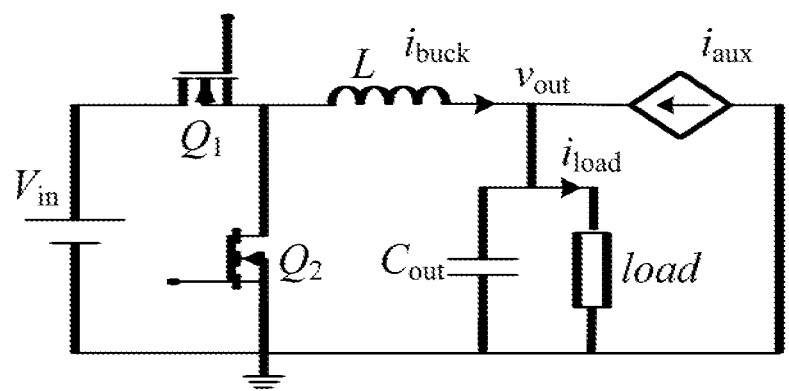
FIG. 2 Simplified circuit with the auxiliary modeled as a controlled current source, demonstrating the current relationships towards the load.

A key factor for assisting the recovery of the main converter from a load transient is the capability of the auxiliary circuit to rapidly sink or source the current mismatch between the new load state and the main inductor current. To analyze the required behavior and control mechanism of the auxiliary unit, an idealized bi-directional current source that is connected to the output terminals of the voltage regulator can be assumed as shown in FIG. 2, which presents a Simplified circuit with the auxiliary modelled as a controlled current source, demonstrating the current relationships towards the load.

Figure 1:
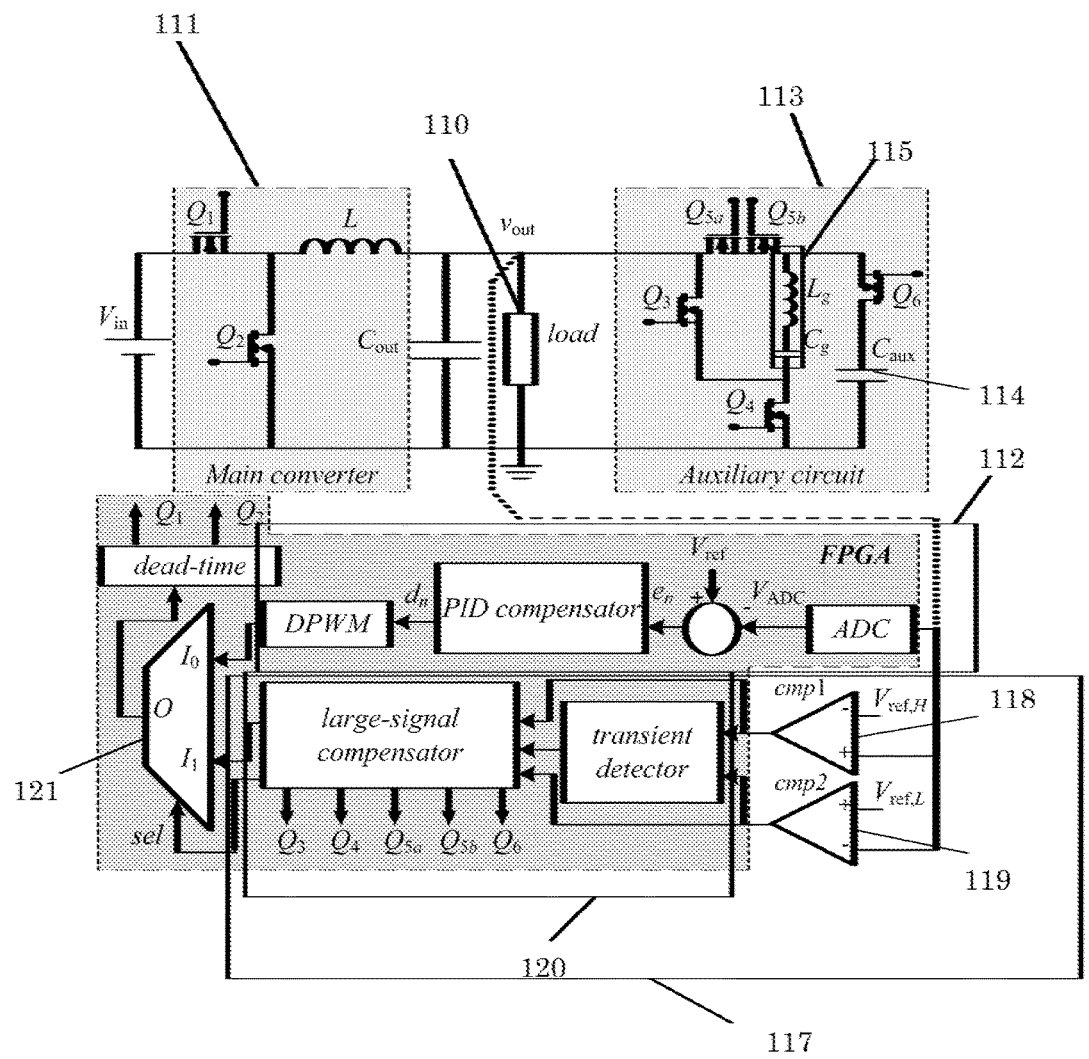
FIG. 1 schematically shows a hybrid VRM with load-side GRSCC auxiliary circuit.

FIG. 1 schematicaly shows the voltage regulation circuit of the present invention.

In FIG. 1, it can be seen a steady-state switch-mode DCDC main conveter 111 (which can be implemented for example as a buck converter) is controled by a steady-state control circuit 112 for maintaining a desired voltage during time period with no abrupt ccurrent changes on the load 110 connected to the output of the main converter. An auxlary circuit 113 connected in parallel to the load operates combined with the main converter to rapidly compensate changes in the output voltage during time periods with abrupt current changes (i.e. transient as loading and unloading) on the load 110 connected to the output of the main converter. The auxiliary circuit 113 includes: (a) capacitor 114 connected in parallel to the load 110, via a resonant circuit 115 and array of switches Q3, Q4, Q5a, 5b, for accumulating excess charge when said output voltage exceeds a first threshold above said desired output voltage and for transferring charge into the load 110 when said output voltage exceeds a second threshold below the desired output voltage. (b) a transient control circuitry 117, consisting of a first comparator 118 for sensing when the output voltage exceeds said first threshold and a second comparator 119 for sensing when the output voltage exceeds said second threshold; (c) a logic and drive circuitry 120 for controlling said array of switches 116 and the inputs Q1, Q2 to said main converter during time periods with abrupt current changes on the load 110; (d) a multiplexer 121 for connecting said steady state control circuitry 112 to said inputs Q1, Q2 during time period with no abrupt current changes in said load and for connecting said transient control circuitry during time periods with abrupt current changes on said load;

The logic and drive circuitry 120 controls the array of switches 116 to transfer a sequence of consecutive current pulses of constant magnitude as long as said output voltage exceeds said first threshold; and controls the array of switches Q3, Q4, Q5a, 5b to stop transferring said sequence when the output voltage does not exceed said first threshold for a predetermined time period, or when said output voltage is below said second threshold.

Figure 3:
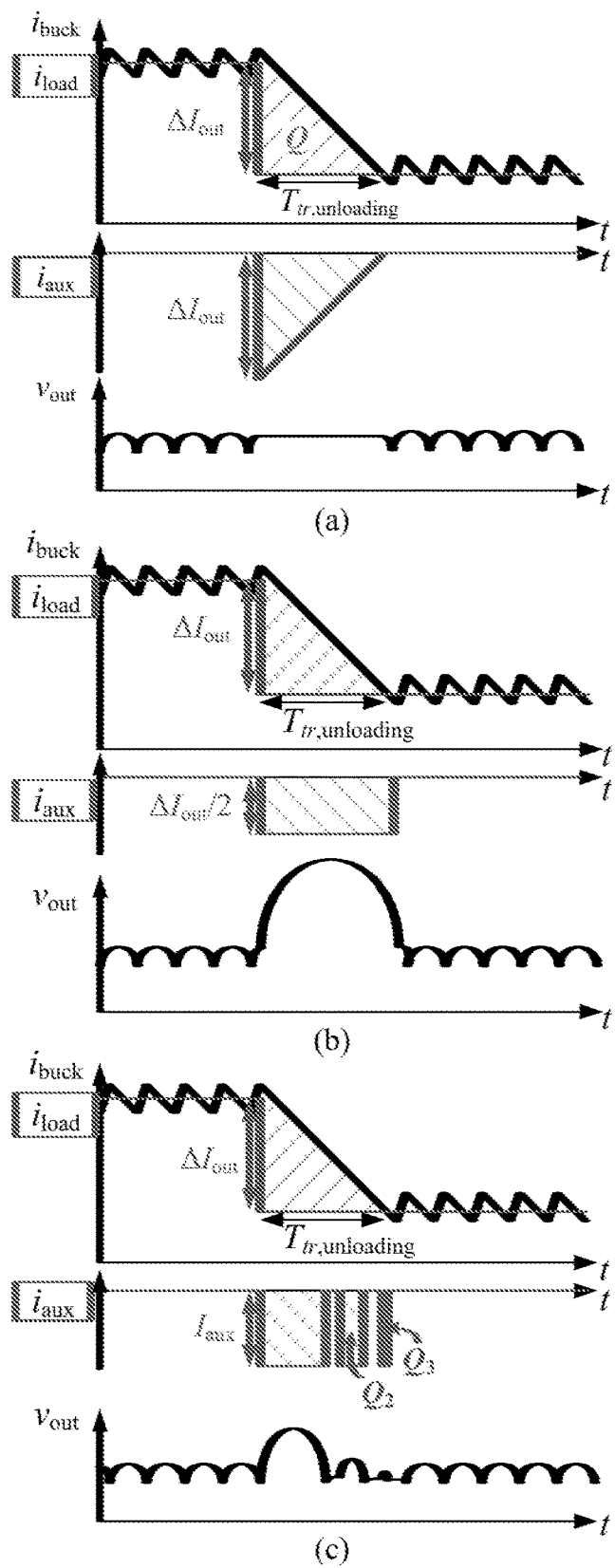
FIG. 3 Schematic response waveforms of the hybrid-VRM to an unloading step of ΔIout for different auxiliary behaviour. (a) iaux≈iload−ibuck, (b) Iaux=ΔIout/2, (c) Iaux>ΔIout/2, segmented to match the overall charge Q.

The analysis is aided by—FIG. 3 which shows average waveforms for different sinking patterns of the current source to a current unloading step of $\Delta I_{out}$. It is further assumed that a time-optimal-like control is implemented for the main converter to maximally expedite the recovery phase.

To eliminate any deviations of $v_{out}$ from the steady-state value, $V_{out}$, the auxiliary circuit is to mimic infinite capacitance, i.e. mirror the mismatch between $i_{buck}$ and $i_{load}$. As shown in FIG. 3(a), the auxiliary current, $i_{aux}$, is triangular, ramping down from $\Delta I_{out}$ and reaching zero when $i_{buck}$ equals $i_{load}$. In this case, the total transient time, $T_{tr}$, is governed by the main inductor's slew-rate and current mismatch, and can be expressed as:

$$T_{tr,loading} = \frac{L}{V_{in} - V_{out}} \Delta I_{out}, \quad T_{tr,unloading} = \frac{L}{V_{out}} \Delta I_{out}, \tag{0}$$

where L is the main inductor value and Vin is the input voltage. This case produces a significantly shorter transient time than obtained using classical time-optimal control approach since no additional discharging is required to drain excess charge from Cout.

Realization of an auxiliary unit as described by FIG. 3(a), rated for the peak load current is, to some extent, overly designed. It requires higher stress-rating components to accommodate for stress that exists for slight fractions of the transient time. Furthermore, an ideal response with zero voltage deviation is not an objective of a VRM. Since some amount of voltage deviation is still tolerable by standard, even in tight VRM applications as shown in [Voltage regulator module (VRM) and Enterprise Voltage Regulator-Down (EVRD) 11.0, Intel Corp., Hillsboro, Oreg., USA, September 2009], a more conservative approach can be taken. As shown in FIG. 3(b), improved unloading transient recovery, provided some allowed deviation margins, can be achieved by a constant current sinking profile of Iaux=ΔIout/2. It can be seen that although Vout initially deviates from Vout, it is fully restored at Ttr. In the aforementioned cases the current source sinks an identical charge within Ttr, meaning that initial under-current is ultimately balanced by over-current at the second half of the transient. Considering a maximum allowable overshoot of ΔVout and the greatest possible load change ΔImax, Cout can be sized as follows:

$$C_{out} = \frac{\Delta I_{max}^2 L}{8 \Delta V_{out} V_{out}} \tag{0}$$

When compared to TOC, the shorter transient times and the smaller initial current mismatch are in favor of a hybrid VRM, resulting in Cout which is four times smaller.

The method shown in FIG. 3(b) reduces the complexity of the auxiliary circuit compared to the method in FIG. 3(a), however, it requires a fairly accurate estimation of the load current. To overcome this obstacle, a recovery pattern as shown in FIG. 3(c) is suggested. In this method the auxiliary current is set to Iaux=ΔImax/2 (by design) while the instantaneous ΔIout is unknown. As long as Iaux≥ΔIout/2, the resultant total transient time remains Ttr, governed by the main inductor's slew-rate.

The design of an auxiliary source that compensates for ΔImax/2 provides two main advantages: 1) the transient controller can be realized based purely on sensing the output voltage and without additional current sensing, and 2) the conditions for the end-of-transient are within the main inductor's slew-rate for any given transient, without the need for extra time to reestablish the steady-state voltage.

Figure 4:
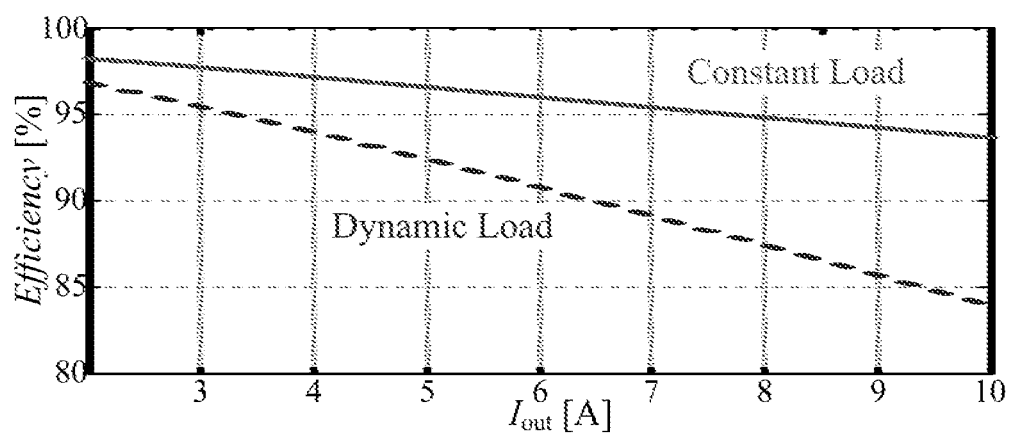
FIG. 4 schematically shows comparison of a typical static efficiency curve compared with a dynamic loading one, for a similar average output power.

Present-day efficiency estimations for dc-dc converters are performed with general assumption of steady-state operation as the dominant working condition, defined here as static conversion efficiency. Neglecting switching losses and assuming steady-state operation, the main contributor for the conduction losses is the average inductor current since the rms current of the ripple component is negligibly small These estimations for the efficiency are relatively accurate for most applications in which the load is static or mostly-static. However, for modern applications with continuously varying loading conditions, the static conversion efficiency estimation might fail to predict the actual losses and as a consequence the required thermal design of the system. FIG. 4 shows comparison of a typical static efficiency curve compared with a dynamic loading one, for a similar average output power. As can be observed, the deviation of the static efficiency estimation from actual one significantly increases with the load repetition rate. It should also be noted that the situation worsen for applications with relatively high conversion ratios, such as the VRM case.

Figure 5:
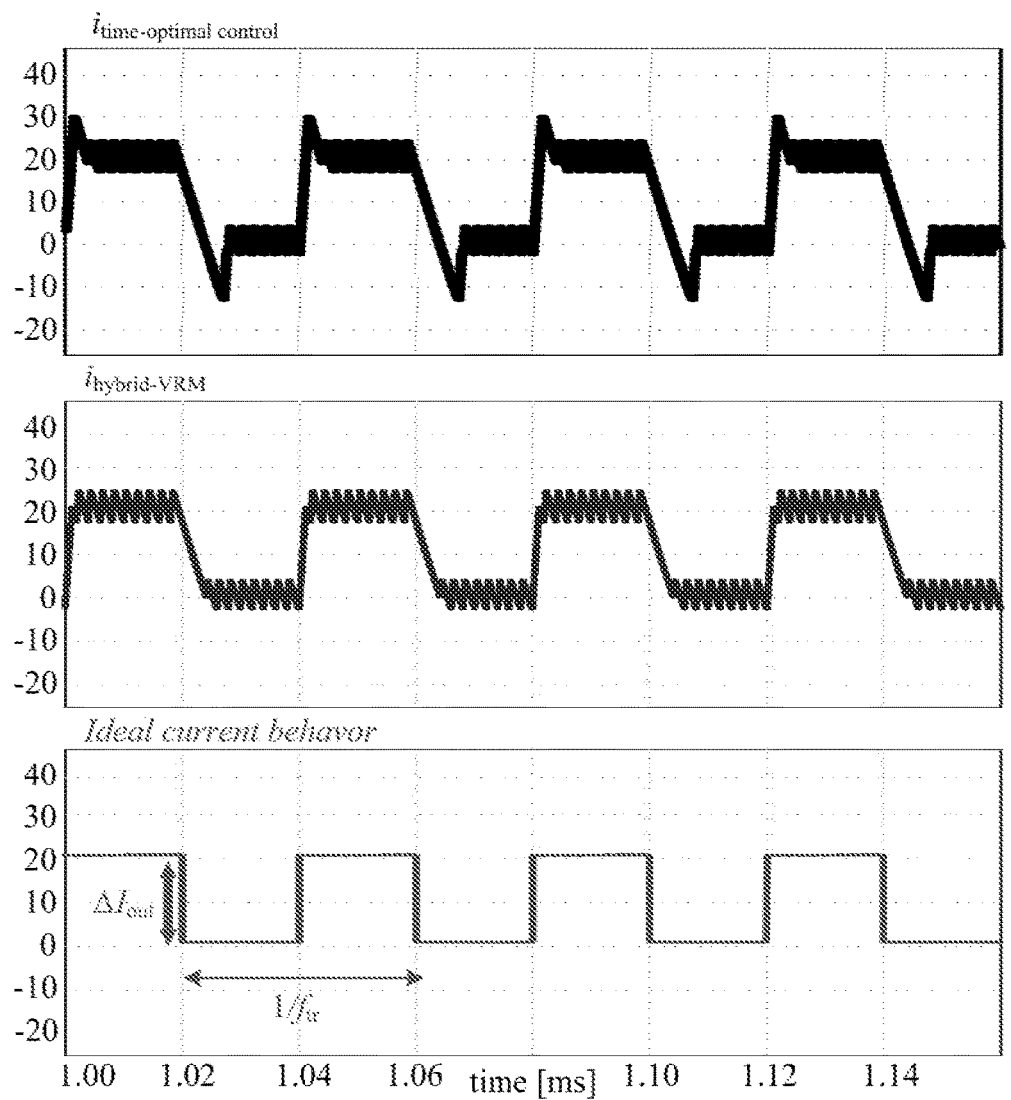
FIG. 5 Inductor current waveforms for time-optimal control, hybrid-VRM and ideal inductor behavior.

To analyze the converter efficiency under varying load conditions, three cases are compared as shown FIG. 5: an ideal inductor current behavior, time-optimal control and beyond time-optimal one which is adopted in the present invention. To focus on the difference between the controllers types, it is assumed that all methods are governed by an identical steady-state control law.

Without loss of generality, the analysis to obtain the rms value of the inductor current for all cases is carried out under the assumption of a repetitive load transient with magnitude of ΔIout and repetition rate of ftr and duty ratio of 50%. For the time-optimal control case, the rms value of the inductor current can be expressed as equation (3), $$I_{RMS-TOC} = \tag{0}$$

$$\sqrt{\begin{aligned}&\left(I_{min} + \frac{\Delta I_{out}}{2}\right)^2 + \left(\frac{\Delta I_{out}}{2}\right)^2 + \frac{\Delta I_{ripple}^2}{12} - \\ &\frac{\Delta I_{ripple}^2 \Delta I_{out} L(1 + \sqrt{D} + \sqrt{1-D})}{12D(V_{in} - V_{out})} f_{tr} + \\ &\frac{\Delta I_{out}^3 L}{12}\left(\frac{(1+\sqrt{D})^3 + \sqrt{1-D}^3}{V_{in} - V_{out}} + \frac{\sqrt{D}^3 + (1+\sqrt{1-D})^3}{V_{out}}\right) f_{tr}\end{aligned}}$$

where Imin is the load current at light load, Imin+ΔIout is the load current at heavy load, ΔIripple is the inductor's steady-state current ripple and D is the steady-state duty cycle, i.e. D=Vout/Vin.

Applying the hybrid-VRM control, the peaks, over and under the steady-state value are eliminated, the transient time is reduced, resulting in an rms current of:

$$I_{RMS-TOC} = \tag{0}$$

$$\sqrt{\begin{aligned}&\left(I_{min} + \frac{\Delta I_{out}}{2}\right)^2 + \left(\frac{\Delta I_{out}}{2}\right)^2 + \frac{\Delta I_{ripple}^2}{12} - \\ &\frac{\Delta I_{ripple}^2 \Delta I_{out} L(1 + \sqrt{D} + \sqrt{1-D})}{12D(V_{in} - V_{out})} f_{tr} + \\ &\frac{\Delta I_{out}^3 L}{12}\left(\frac{(1+\sqrt{D})^3 + \sqrt{1-D}^3}{V_{in} - V_{out}} + \frac{\sqrt{D}^3 + (1+\sqrt{1-D})^3}{V_{out}}\right) f_{tr}\end{aligned}}$$

$$I_{RMS,hybrid-VRM} = \tag{0}$$

$$\sqrt{\left(I_{min} + \frac{\Delta I_{out}}{2}\right)^2 + \left(\frac{\Delta I_{out}}{2}\right)^2 + \frac{\Delta I_{ripple}^2}{12} + \frac{\Delta I_{out} L(\Delta I_{out}^2 - \Delta I_{ripple}^2)}{12D(V_{in} - V_{out})} f_{tr}}.$$

Figure 6:
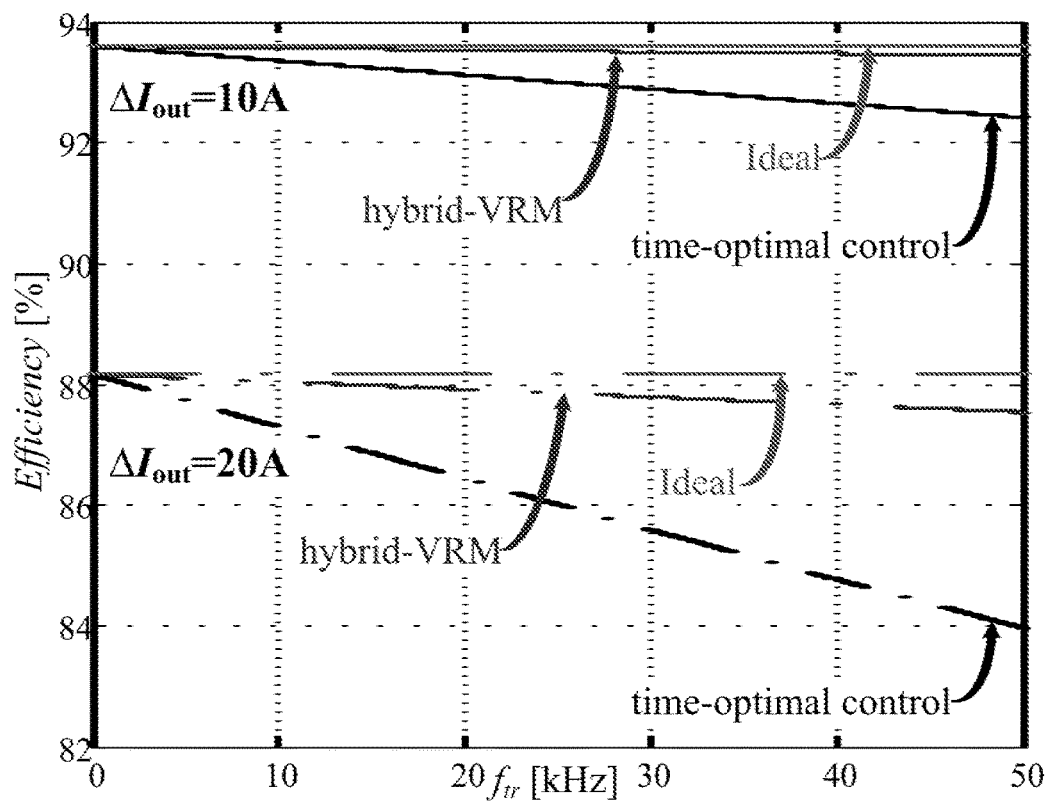
FIG. 6 schematically shows VRM efficiency as a function of load.

Comparison of the resultant efficiency curves of (3), (4) and the ideal current waveform as a function of the load transients rate is shown in FIG. 6. As can be observed, the elimination of the additional restoration current, i.e. peaks, reduces the overall rms inductor current that in turn increases the power processing efficiency.

In addition, another design concern is the inductor sizing. As derived in [E. Meyer, Z. Zhang, Y-F. Liu, "An optimal control method for buck converters using a practical capacitor charge balance technique", IEEE Trans. Power Electron., vol. 23, no. 4, pp. 1802-1812, July 2008], time-optimal control results in current overshoot of $\Delta I_{out}\sqrt{D}$ and undershoot of $\Delta I_{out}\sqrt{1-D}$ during loading and unloading transients of $\Delta I$out, respectively. Since these are eliminated by the hybrid-VRM approach, the sizing of the main inductor reduces as well.

The GRSCC topology has been recently presented in [A. Cervera, M. Evzelman, M. M. Peretz, and S. Ben-Yaakov, "A High Efficiency Resonant Switched Capacitor Converter with Continuous Conversion Ratio," IEEE Trans. Power Electron, vol. 30, no. 3, pp. 1373-1382, March 2015], based on the concept of a resonant switched-capacitor converter, but with the capability to maintain high efficiency over a wide and continuous step-up/down conversion ratio. Thanks to its soft-switching resonant nature it is applicable at high frequencies, and as a consequence, does not require a magnetic element. Furthermore, it has a bi-directional current sourcing behavior and is able to react immediately to create current step response with bandwidth of up to half its maximal switching frequency as described at [A. Cervera, M. M. Peretz, "Resonant switched-capacitor voltage regulator with ideal transient response," IEEE Transactions on Power Electronics, vol. 30, no. 9, pp. 4943-4951, September 2015].

A voltage doubling variation of the GRSCC has been implemented in the present invention and is shown as the auxiliary circuit of FIG. 1. It is structured relying on a voltage multiplying resonant switched capacitor converter topology, shifting the GRSCC's optimal efficiency point from Vout to VC,aux=2Vout. The main reason for the selection of this topology is to increase the power density of the auxiliary storage capacitor Caux by increasing its rated voltage, but without adding voltage stress to the transistors. Another advantage of the doubling realization is that the desired load-side current, i.e. $\Delta I$max/2, can be obtained by a higher characteristic impedance of the resonant network. This implies that higher target efficiency of the GRSCC can be obtained for a given loop resistance.

The GRSCC is resonant in nature and can be completely halted at zero-current after each cycle. As a result, the nominal current can be resumed within one cycle. In the context of the present invention, this zero-order step capability enables the GRSCC to be used as the auxiliary current source unit. Moreover, there is no limitation to scalability, the resonant tank values can be determined for any desired Vout and operating frequency with further option of interleaved operation. The bridge configuration also guarantees that the maximum stress on any given switch will be around Vout, which translates into small area requirements of the power switches.

To further reduce the overall volume of system and enhance the auxiliary circuit efficiency, it is realized in the present invention using three small interleaved GRSCC modules, each designed to output $\Delta I$max/6, operating with phase delay of half-resonance period, as demonstrated in FIG. 7. By doing so, the auxiliary circuit rms current is reduced by a factor of $(2/3)^{0.5}$, when compared to a single-converter equivalent since smaller pulses are evenly distributed over the transient phase, for the same average current. This configuration also increases the accuracy and resolution as a current source. Furthermore, lower current is required per module, allowing higher impedance of the resonant network.

The configuration of the hybrid-VRM controller is divided into two main units as shown in FIG. 1, a steady-state voltage-mode controller that is entirely implemented on FPGA [Y. Halihal, Y. Bezdenezhnykh, I. Ozana, M. M. Peretz. "Full FPGA-Based Design of a PWM/CPM Controller with Integrated High-Resolution Fast ADC and DPWM Peripherals," IEEE Workshop on Control and Modeling for Power Electronics (COMPEL) 2014] and a transient-mode controller.

To facilitate fast transient detection and end-of-transient phase, the latter is assisted by two auxiliary comparators with two thresholds, well below the maximum allowed voltage deviation, to determine both loading and unloading events.

Principle of operation:

The description of the hybrid-VRM controller operation is assisted by—which provides in-detail the response for an unloading transient event.

At t<t0 the controller operates the buck converter with a voltage-mode steady-state compensator whereas the GRSCCs are idle. A load step at t0 creates current mismatch between $i_{buck}$ and $i_{load}$ resulting in a rise of Vout. At t1, when Vout crosses Vref,H, an unloading event is detected by cmp1 (FIG. 1) and a transient mode is initiated: Q2 is turned on to ramp ibuck down with the highest slew-rate available. Simultaneously, the GRSCCs are activated to sink excess current and are set to Iaux=$\Delta I$max/2. Since $\Delta I$out<$\Delta I$max, at instance t2, Vout returns within the steady-state range below Vref,H, the GRSCCs' operation is halted while Q2 remains on, however, ibuck is still larger than iload. This results in the output voltage rising over Vref,H at t3 which re-triggers the GRSCCs. When vout is within the steady-state range at t4, ibuck approximately equals to iload. The end of the transient phase (t5), in this case, is due to vout crossing Vref,L, detected by cmp2.

The information on the end-of-transient is derived, in the present invention, from the output voltage measurement by observing the comparator states. However, the information that is obtained from the output voltage indicates on the current charge state of the output capacitor and not directly on the current mismatch between ibuck and iload. Given the example of FIG. 3(c), it can be observed that the output voltage is momentarily restored to the steady-state value without reaching the point that $i_{buck}$ equals $i_{load}$. The reason for this is that the charge balance has been achieved by the aid of the auxiliary circuit.

To overcome the problem of premature indication on the end-of-transient, without additional current sensors, a state-machine algorithm described by the flowchart of FIG. 9, was developed. The controller monitors the output voltage by observing the comparator states. When Vout returns within the steady-state thresholds, the GRSCCs are immediately halted whereas the buck converter remains is transient mode. In case that a current mismatch still exists, the output voltage is shifted back beyond the boundaries, and the auxiliary circuit is re-triggered. A true end-of-transient indication (i.e., $i_{buck}$ is in the vicinity of ($i_{load}$) is verified by either one of the necessary conditions: (a) the comparators state has been inverted from the original transient-mode trigger, or (b) a preset time has elapsed since the auxiliary unit was halted without change in the comparator states.

Comparators Thresholds Settings

A finite voltage difference between the comparators thresholds is required to prevent the controller from falsely entering or exiting the transient mode. To prevent false entry, it is sufficient to satisfy that the voltage difference between the thresholds is well above the steady-state voltage ripple and accounting for additional noise errors (e.g. ESR, switching noise, and measurement errors). However, to prevent a false indication of the comparators state and an early return to the steady-state mode, the difference between thresholds should be set such that the largest voltage deviation generated from a single discharge cycle of the auxiliary circuit is kept within the threshold boundaries. The largest value for this deviation occurs when current mismatch is small (ibuck≈iload), that is:

$$V_{ref,H} - V_{ref,L} \geq Q_g / C_{out} = 4 V_{out} C_g / C_{out},\qquad(0)$$

where Qg is the charge delivered from the auxiliary circuit during a single discharge cycle. Selection of the voltage detection window according to (5) assures that the voltage-drop due to a single gyrator pulse is contained within threshold levels.

Auxiliary circuit halt time-$T_{preset}$,

As described earlier, steady-state operation may be resumed by either inversion of the comparators state or after specific time has elapsed since the auxiliary unit was halted ($t_{preset}$ in FIG. 9). Given the controller sequence when steady-state is resumed, and an estimation on the range of error for the buck inductor current at that instance, the preset time can be set to assure that the steady-state operation is restarted without creating additional oscillations. In the present invention, it is defined that the first switching action of the steady-state controller is the opposite of the one obtained in the non-linear mode, i.e. resuming from an unloading event starts with an on state, whereas an on state during a loading event is followed by an off state. This implies that the preferred instance to switch back to the steady-state is when the inductor current has passed the target load current value since less error in the inductor current is accumulated by the following switching action. The ideal case would be at the point that the inductor current is beyond the load value by $\Delta I_{ripple}/2$, then the steady-state current is already within the target margins within the first switching action. Since this case cannot be guaranteed by voltage sensing alone, it is essential to map the range of the possible error in the current with respect to the preset halt time.

FIG. 10 shows a zoomed-in view to the preset instance, describing $i_{buck}$ within two worst-case scenarios. The time index, $t_{last}$, indicates the instance of the last trigger event of the auxiliary circuit. The lower boundary of the inductor current is characterized as the condition when the inductor current reached the load current at $t_{last}$, given by:

$$i_{buck,min}(t_{last}+t) = I_{load} + at,\qquad(0)$$

where a is the slope of the buck inductor current during the transient, given by:

$$a = -V_{out}/L,\text{ unloading}$$

$$a = (V_{in} - V_{out})/L,\text{ loading}.\qquad(0)$$

The upper boundary of the inductor current is due to an additional charge injection by the auxiliary circuit, Qg, at the instance of tlast, given by:

$$i_{buck,max}(t_{last}+t) = I_{load} - a\sqrt{2Q_g/|a|} + at.\qquad(0)$$

Equating (8) to Iload and solving for t, yields the necessary condition to assure that the worst-case inductor current has reached the load current, that is:

$$T_{match} = \sqrt{2Q_g/|a|},\qquad(0)$$

namely, the auxiliary circuit has completed its operation for the particular transient mode.

To further reduce the error of the inductor current to the allowed range of {ΔItarget,max, ΔItarget,min}, a target time range for return to steady-state is specified, as shown in FIG. 10. Equating (6) to the lower current boundary and (8) to the upper one, yields the margin criterion, Tmin and Tmax, for Tpreset as:

$$T_{min} = \Delta I_{target,min}/|a| + \sqrt{2Q_g/|a|}$$

$$T_{max} = \Delta I_{target,max}/|a|\qquad(0)$$

It should be noted that it is required to assure that the defined Tpreset satisfies the conditions in (10) and the minimum time condition in (9), that is, $$\max(T_{min}, T_{match}) \leq T_{preset} \leq T_{max}\qquad(0)$$

Furthermore, to avoid dependence of Tpreset on the converter parameters and present dependence on the design considerations alone, (9) and (10) can be reorganized as:

$$T_{min} = \frac{\Delta I_{target,min}(1-D)}{KI_{nom}f_s} + \sqrt{\frac{\Delta I_{max}}{KI_{nom}f_s f_g}}\qquad(0)$$

$$T_{max} = \Delta I_{target,max}(1-D)/KI_{nom}f_s$$

$$T_{match} = \sqrt{\Delta I_{max}/KI_{nom}f_s f_g}$$

where fs is main converter switching frequency and fg is the GRSCC maximal frequency, Inom is the nominal load current at steady-state, and K=ΔIripple/Inom is the proportionality factor between the ripple and nominal currents. The criterion for a loading event can be extracted in a similar manner.

The amount of energy that is processed by the auxiliary circuit during a transient event depends on the conversion ratio of the buck converter. In the present invention of a 12V to 1.5V converter, during an unloading transient more charge is processed by the auxiliary than during a loading transient of a similar magnitude. To maintain the ability to sink or source sufficient current from the output capacitor, prevent Caux from over-charging, and restore excess energy, a reset procedure for the independent auxiliary capacitor is essential.

A key consideration in the design of the reset procedure is to avoid interference with the desired steady-state operation of the main converter, i.e., that the reset procedure will not cause a significant change of the output voltage. This implies that the auxiliary reset current has to sink or source sufficiently small amount of charge per pulse and to be distributed over a longer period of time compared to the total load transient time. To this end, in the present invention, one of the three GRSCC modules is further employed during the steady-state phase to balance the auxiliary charge and reset the capacitor voltage back to its target value. Since the output voltage is well-regulated by the steady-state controller, the module is allowed to operate as a classical open-loop resonant switched-capacitor converter, forcing the auxiliary capacitor to converge to 2Vout, without any additional sensors. To limit the average current injected by the module during the reset phase, the effective operating frequency can be reduced by additional time delay between RSCC cycles.

FIG. 11 can be used to demonstrate the reset procedure. It shows an unloading transient that causes Vaux to rise due to the current sinking operation. It is then followed by a reset performed using one GRSCC module operating as a RSCC at lower effective frequency which restores Vaux back to the target value of 2Vout. It can also be observed that the voltage-mode control law maintains Vout within its steady-state margins. In order to validate the operation of the hybrid-VRM, a 30 W 12-to-1.5V prototype was built and tested, with a measured peak efficiency of 90%. The auxiliary circuit was realized by three interleaved GRSCCs as described in Section III. Table I lists the component values and parameters of the experimental prototype. The digital controller comprises a steady-state voltage-mode control and a transient-mode control and was realized on an Altera Cyclone IV FPGA. Steady-state control is assisted by integrated high-performance ADC (presented in PCT IL2015/050521) and DPWM on-FPGA. Load transient signals were also generated by the FPGA, independently, without synchronization to the controller.

FIG. 12 shows the system's response to various loading and unloading transient events of 10A and 15A, in comparison to a buck converter operating under TOC, using same transient detection circuit. FIG. 12(a) shows the system's response to an unloading transient event of 10A (15A to 5A). The performance of the system results in output voltage overshoot of 60 mV and settling time of 4 μs, compared with 150 mV and 8 μs using TOC as shown in FIG. 12(b). The system response to a larger, 15A unloading step (20A to 5A), is given in FIG. 12(c). A voltage overshoot of 100 mV and a total transient time of 6.4 μs are measured, compared to 230 mV and 9.8 μs using TOC, as depicted in FIG. 12(d). A loading transient event of 10A (5A to 15A) is depicted in FIG. 12(e). As can be observed, the voltage undershoot of 30 mV is mainly dominated by the inherent delay added by the transient detection circuit. It should be noted that in the loading event, the auxiliary GRSCCs were operated synchronously rather than phase-delayed due to the large conversion ratio of the VRM, resulting in a higher slew-rate of the inductor current. The same loading event using TOC results in a similar undershoot of 40 mV, again, due to the delay of the transient detection circuit delay. FIG. 13 shows the system's response to a consecutive loading-unloading event of 10A (5A to 15A to 5A). The resulting overshoot and undershoot are similar to the specific cases presented by FIG. 12(a) and FIG. 12(c), respectively. FIG. 14 shows the auxiliary reset procedure, confirming its capability to balance the charge of the auxiliary capacitor without affecting the steady-state operation.

A voltage regulator module with improved loading and unloading transient response has been presented. The improvement has been achieved by the addition of a load-side auxiliary unit that comprises three interleaved converters, implemented using a recently presented GRSCC topology. This VRM has the potential to be space conserving and cost-effective when implemented into an IC design. The output capacitance is significantly reduced at the cost of small additional semiconductors and few capacitors, and does not require ferromagnetic elements.

The experimental results exemplify the performance of the design for both loading and unloading events, reducing output overshoots by up to 60% and transient time by up to 50% compared to time-optimal control, without affecting the input side. In particular for the relatively high conversion ratio case, significant improvement has been demonstrated in the response to an unloading event, compensating for the moderate current slew rate of the buck inductor.

The hybrid-VRM operates autonomously with reduced circuit complexity, i.e. no additional current-sense circuitry or pre-transient information is required. In addition, since no complex mathematical estimations are needed, the complete FPGA implementation for the control (Including the ADC and DPWM peripherals) sums less than 8000 logic elements, providing a cost-effective and simple controller solution.

The invention claimed is:

1. A voltage regulator module circuit, comprising:
   a. a steady-state switch-mode main DC-DC converter having a steady-state control circuitry, for maintaining a desired output voltage;
   b. an auxiliary circuit connected in parallel to a load for assisting a main converter to rapidly compensate changes in an output voltage during time periods with abrupt current changes on the load connected to the output of said main converter, said auxiliary circuit including:
      b.1. a capacitor connected in parallel to said load, via a resonant circuit and array of switches, for accumulating excess charge when said output voltage exceeds a first threshold above said desired output voltage and for transferring charge into said load when said output voltage exceed a second threshold below said desired output voltage;
      b.2. a transient control circuitry consisting of a first comparator for sensing when the output voltage exceeds said first threshold and a second comparator for sensing when the output voltage exceeds said second threshold;
      b.3. a logic and drive circuitry for controlling said array of switches and the inputs to said main converter during time periods with abrupt current changes on said load;
      b.4. a multiplexer for connecting said steady-state control circuitry to said inputs during time period with no abrupt current changes in said load and for connecting said transient control circuitry during time periods with abrupt current changes on said load;
   wherein said logic and drive circuitry is adapted to:
   c. control said array of switches to transfer a sequence of consecutive current pulses of constant magnitude as long as said output voltage exceeds said first threshold;
   d. control said array to stop transferring said sequence when said output voltage does not exceed said first threshold for a predetermined time period, or when said output voltage is below said second threshold.

2. A voltage regulation circuit according to claim 1, wherein during time periods with no abrupt current changes on the load, the transient control circuitry is adapted to:
   charge or discharge the capacitor to reach a nominal voltage before starting the compensation for the next period by controlling the array of switches to connect and disconnect said capacitor to said load for predetermined time periods, such that in response, the steady-state control circuitry compensates changes in the output voltage during the charge or discharge of said capacitor.

3. A voltage regulation circuit according to claim 1, wherein the auxiliary circuit comprises:
   a. a capacitor connected in parallel to a series resonant circuit via a first switch connecting one port of said capacitor to one port of said resonant circuit and a second switch connecting between the second port of said capacitor to the second port of said resonant circuit;

b. a third switch connecting said one port of said capacitor to one port of the load;
c. a fourth switch connecting between said one port of the load and the second port of said resonant circuit;
wherein the second port of said capacitor is directly connected to the second port of said load.

4. A voltage regulation circuit according to claim 3, wherein the auxiliary energy bank capacitor is connected to an energy absorbing or injecting circuit.

5. A voltage regulation circuit according to claim 1, wherein the control is done by voltage sensing alone.

6. A voltage regulation circuit according to claim 1, wherein the constant magnitude of said sequence of consecutive current pulses is at least half of the maximal load current change, being at least half of the rated current of the main converter.

7. A voltage regulation circuit according to claim 1, wherein the main converter is a switch-mode step-down converter.

8. A voltage regulation circuit according to claim 1, comprising multiple interleaved auxiliary circuits connected in parallel to the load.

9. A voltage regulation circuit according to claim 8, wherein the constant magnitude of said sequence of consecutive current pulses is at least 1/(2n) of the maximal load current change, being at least 1/(2n) of the rated current of the main converter, where n is the number of the multiple interleaved auxiliary circuits.

10. A method according for improving a response to abrupt changes of load current of a voltage regulator circuit, comprising:
   a. maintaining, by a steady state main DC-DC converter having a steady-state control circuitry, a desired output voltage;
   b. assisting a main converter to rapidly compensate, by an auxiliary circuit connected in parallel to a load, changes in an output voltage during time periods with abrupt current changes on the load connected to the output of said main converter;
   c. accumulating, by a capacitor connected in parallel to said load, via a resonant circuit and array of switches, excess charge when said output voltage exceeds a first threshold above said desired output voltage and transferring charge into said load when said output voltage exceed a second threshold below said desired output voltage;
   d. sensing, by a transient control circuitry consisting of a first comparator, when the output voltage exceeds said first threshold, and sensing by said transient control circuitry consisting of a second comparator, when the output voltage exceeds said second threshold;
   e. controlling, by a logic and drive circuitry, said array of switches and inputs to said main converter during time periods with abrupt current changes on said load;
   f. connecting by a multiplexer, said steady-state control circuitry to said inputs during time period with no abrupt current changes in said load and said transient control circuitry during time periods with abrupt current changes on said load;
   g. controlling said array of switches to transfer a sequence of consecutive current pulses of said constant magnitude as long as said output voltage exceeds said first threshold; and
   h. controlling said array to stop transferring said sequence when said output voltage does not exceed said first threshold for a predetermined time period, or when said output voltage is below said second threshold.

11. The method of claim 10, wherein the constant magnitude of said sequence of consecutive current pulses is at least half of the maximal load current change, being at least half of the rated current of the main converter.

12. The method of claim 10, wherein the control is done by voltage sensing alone.

13. The method of claim 10, wherein the voltage regulation circuit comprises multiple interleaved auxiliary circuits connected in parallel to said load.

14. The method of claim 12, wherein the constant magnitude of said sequence of consecutive current pulses is at least 1/(2n) of the maximal load current change, being at least 1/(2n) of the rated current of the main converter, where n is the number of the multiple interleaved auxiliary circuit.

15. The method of claim 10, wherein the auxiliary circuit includes an energy aggregating module, being a capacitor or a power supply.

* * * * *